C. C. WILSON.
NON-HEAT CONDUCTING RECEPTACLE.
APPLICATION FILED AUG. 15, 1912.

1,099,228.

Patented June 9, 1914.

3 SHEETS—SHEET 1.

Witnesses:

Inventor

C. C. WILSON.
NON-HEAT CONDUCTING RECEPTACLE.
APPLICATION FILED AUG. 15, 1912.
1,099,228.
Patented June 9, 1914.
3 SHEETS—SHEET 2.
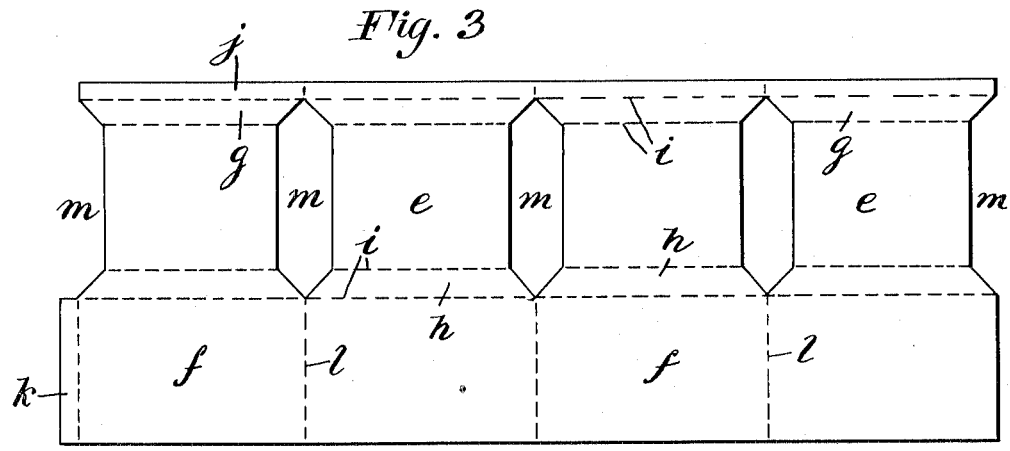
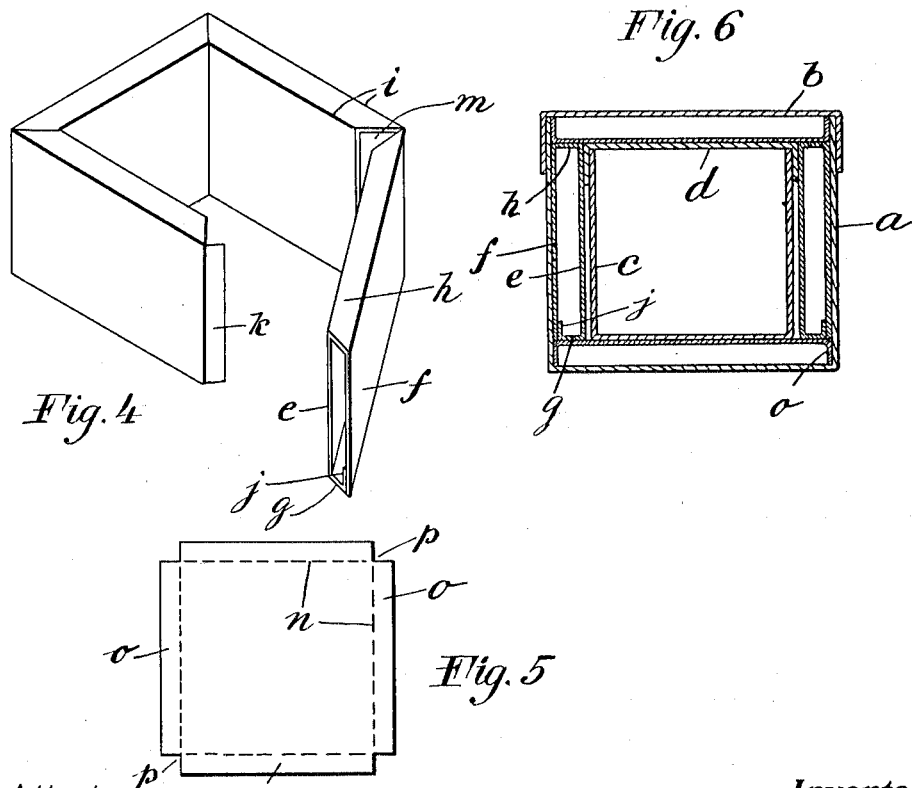

C. C. WILSON.
NON-HEAT CONDUCTING RECEPTACLE.
APPLICATION FILED AUG. 15, 1912.
1,099,228.
Patented June 9, 1914.
3 SHEETS—SHEET 3.
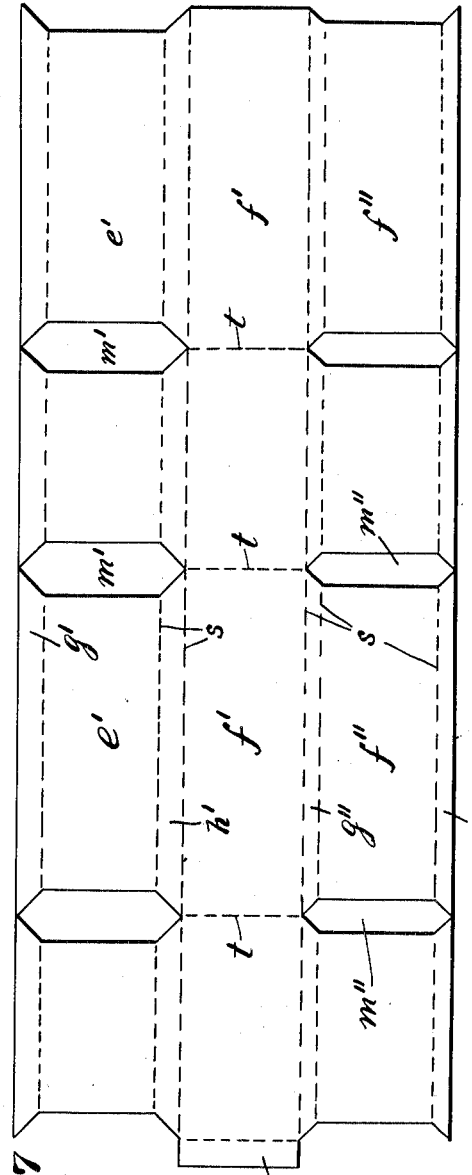
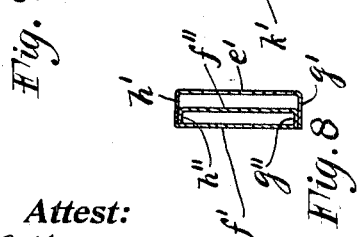
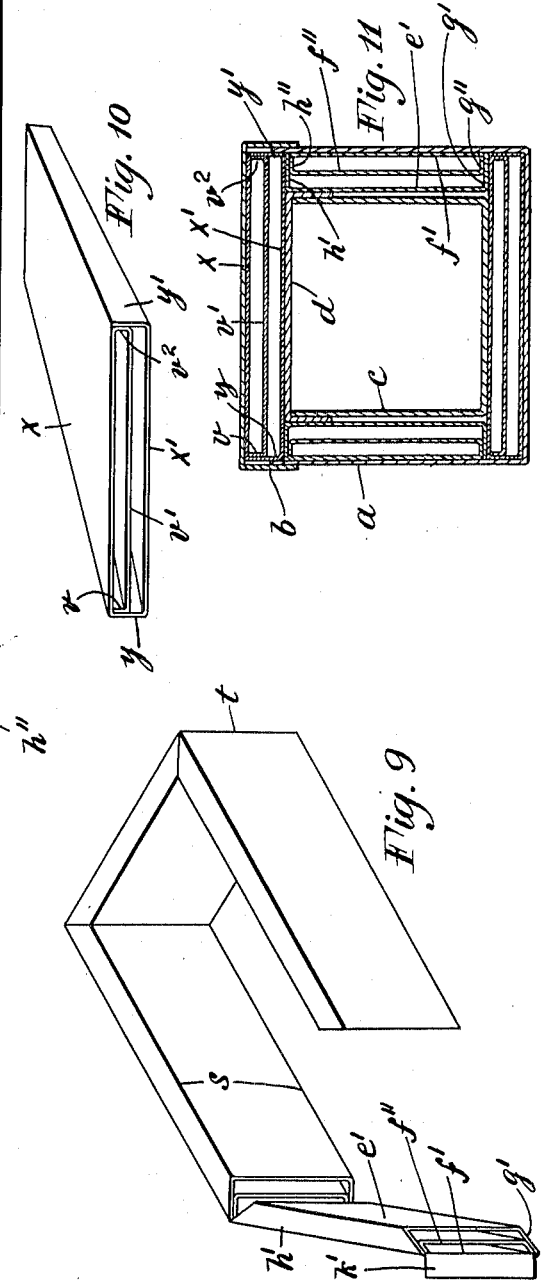
Attest:
Inventor:
Clarence C. Wilson
by
Atty

UNITED STATES PATENT OFFICE.

CLARENCE C. WILSON, OF BRIDGEPORT, CONNECTICUT, ASSIGNOR TO THE WARNER BROTHERS COMPANY, OF BRIDGEPORT, CONNECTICUT, A CORPORATION OF CONNECTICUT.

NON-HEAT-CONDUCTING RECEPTACLE.

1,099,228. Specification of Letters Patent. Patented June 9, 1914.

Application filed August 15, 1912. Serial No. 715,194.

*To all whom it may concern:*

Be it known that I, CLARENCE C. WILSON, a citizen of the United States of America, resident of the city of Bridgeport, county of Fairfield, State of Connecticut, have made a new and useful Improvement in Non-Heat-Conducting Receptacles, of which the following is a specification.

My invention relates to non-heat-conducting receptacles in which air chambers are provided in the walls of the receptacle. The receptacle and the walls of the air chambers may be made of any suitable material although I prefer to make them of paper box board. The receptacle may be placed on the market in made-up form or in knock-down style. I prefer to make both the receptacle and the air chambers in knock-down or collapsible style, as such may be easily packed and transported.

The object of the invention is to provide a non-heat-conducting receptacle which may be used in connection with the preservation of food-stuffs whether hot or cold,—in the one case the air chambers retain the heat in the contents of the receptacle, and in the other case the air chambers exclude the heat from the contents of the receptacle.

In the following I have described in connection with the accompanying drawings, several forms of structures illustrating the application of my invention, the features thereof being more particularly pointed out hereinafter in the claims.

Figure 1:
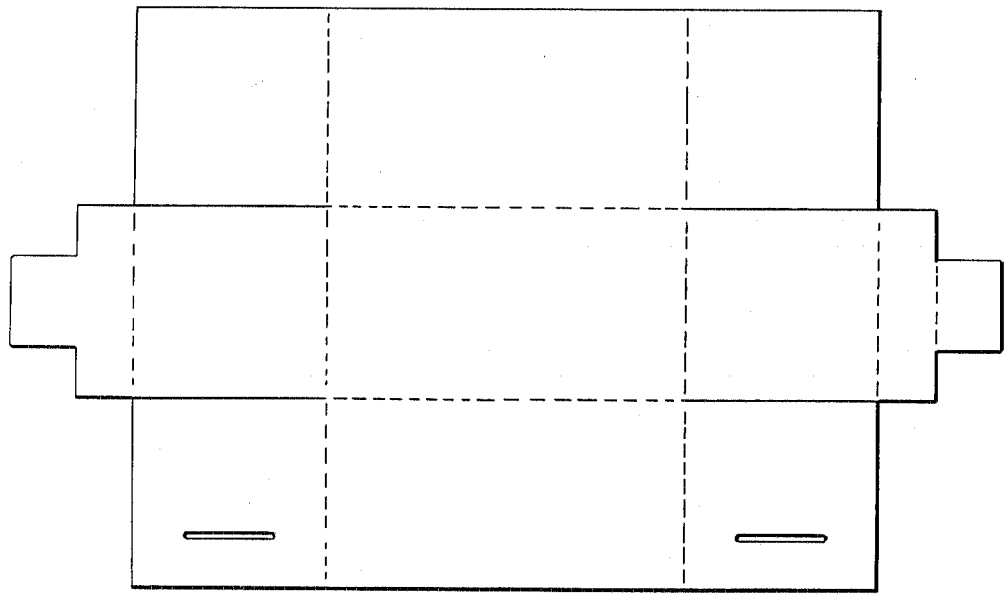
Figure 2:
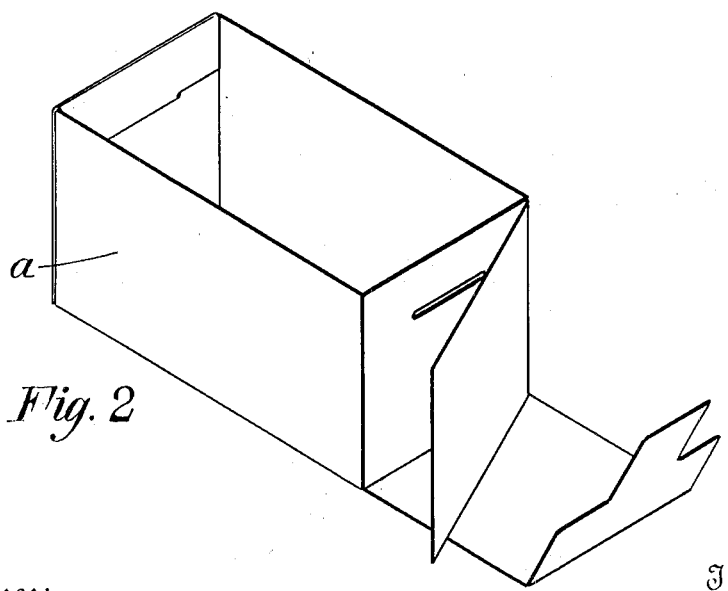

In the drawings, Figure 1 is a blank of a knock-down box adapted to form either the inner or outer container of the receptacle, and Fig. 2 is a perspective view of the same, folded and partly open. Fig. 3 is a plan view of a blank showing the method of cutting and scoring for forming an air chamber. Fig. 4 is a perspective view showing the side air chamber of the receptacle formed from the blank shown in Fig. 3, left partly open to show the construction. Fig. 5 is a plan view of a blank for forming an air chamber at the top or bottom of the receptacle and showing the method of cutting and scoring the same. Fig. 6 is a cross-section showing the inner and outer containers and the air chambers assembled. Fig. 7 is a plan view of a modification showing a blank for forming a plurality of air chambers and the method of cutting and scoring the same. Fig. 8 is a cross-section of the air chambers made by forming up the blank shown in Fig. 7. Fig. 9 is a perspective view of the air chambers formed up from the blank shown in Fig. 7 and comprising the sides of the receptacle, the same being left partly open to show the construction. Fig. 10 is a perspective view of a double air chamber for forming the top or bottom of the receptacle. Fig. 11 is a cross-section of the structure shown in Figs. 7 to 10, assembled in a complete form and showing the inner and outer containers, together with the air chambers surrounding the same.

Similar letters of reference indicate similar parts throughout the several views.

$a$ indicates the outer container, $b$ the cover therefor, $c$ the inner container and $d$ the cover therefor. The outer container may be made of any suitable material such as pasteboard, strawboard, metal, glass, basket-weaving, etc. The inner container may also be of any desired character of material or may be entirely omitted.

The blank shown in Fig. 3 comprises side walls $e$ and $f$ and top and bottom walls $g$ and $h$. The scorings $i, i$ indicate where the blank is to be folded lengthwise to form the side walls and top and bottom respectively. $j$ indicates a flap adjacent the portion $g$ adapted to be turned up and pasted or otherwise secured against the inside of the side wall $f$ as shown in Fig. 4. $k$ indicates a flap at the end of the portion $f$ adapted to be pasted or otherwise secured to the outside of the portion $f$ when the structure is formed up, as shown in Fig. 4. $l, l$ indicate vertical scorings on the blank shown in Fig. 3 showing where the blank is to be folded to form the outer corners of the air chamber structure. $m, m$ indicate cut-out portions in the blank to provide for the forming of the inner corners of the blank when folded as shown in Fig. 4.

Fig. 5 indicates a blank having scorings $n, n$ for folding the flaps $o, o$ upward so as to provide for the top and bottom air chambers of the receptacle, the cut-out portions $p, p$ of the blank shown in Fig. 5 permitting the close juxtaposition of the flaps $o$ at the corners when turned upward.

In assembling the structure shown in Figs. 3 to 6 inclusive, the side air chamber is formed by folding the blank shown in Fig. 3 as described so that it assumes the shape shown in Fig. 4. The flap $k$ is pasted or otherwise secured to the outside of the wall *f*. One of the blanks shown in Fig. 5 is folded as described and placed in the bottom of the outer container *a* in inverted position, as shown in Fig. 6. The air chamber structure shown in Fig. 4 is then placed inside the container, with one of the walls *g* or *h* resting against the bottom air chamber as shown. The inner container *c* may then be filled as desired, covered and placed within the receptacle. Another blank similar to that shown in Fig. 5 is then placed on top of the inner container and resting against the upper wall of the side air chamber, and the cover *b* put in place. It is obvious that by the means described the inner container, or if that is omitted, the inner space of the receptacle, is entirely surrounded by air chambers.

In Figs. 7 to 11 inclusive, I have shown a modification of the structure shown in Figs. 3 to 6 inclusive. In the structure shown in Figs. 7 to 11 inclusive, the blank, Fig. 7, is provided with portions $e'$, $f'$, and $f''$ adapted to form the inner, outer and middle walls of the air chamber structure. $g'$ is a portion adapted to form the bottom wall of the air chamber and $h'$ is a portion adapted to form the top wall thereof. $g''$ is adapted to form the top wall of the inner partition and $h''$ the bottom thereof. $k'$ is a flap at the end of the part $f'$ adapted to be pasted or otherwise secured to outer wall of the portion $f'$ when the box is formed up. $s, s$ indicate the longitudinal scorings on which the blank is to be folded lengthwise and $t, t$ indicate the vertical scorings to form the outer corners of the air chamber. $m', m'$ and $m'', m''$ are cut-out portions to provide for the inner corners of the air chambers, $m^2$ being smaller than $m'$ so that when the box is assembled the ends of the portions $e'$ and $f^2$ opposite each other at either side of cut-out portions $m'$ and $m^2$ respectively, will come into juxtaposition to form substantially closed continuous air cells. When formed up the air chambers assume the position shown in Fig. 9. The top and bottom air chambers may each be made of a single piece folded upon itself as shown in Fig. 10, so as to form a two-celled air chamber having a spacing wall $v$, central wall $v'$, spacing wall $v^2$, top $x$, end wall $y$, bottom $x'$ and end wall $y'$, the end wall $y'$ being pasted or otherwise secured to spacing wall $v^2$.

In assembling the structure shown in Figs. 7 to 11 inclusive, the side double air chambers are formed by folding the blank shown in Fig. 7 as described so that it assumes the shape shown in Fig. 9. The flap $h^2$ is pasted or otherwise secured to wall $h'$ and flap $g'$ is pasted or otherwise secured to wall $g''$. Flap $k'$ is then pasted or otherwise secured to the outside of wall $f'$ as indicated in Fig. 9. The top or bottom air chamber structures are formed up as heretofore described. One of the top or bottom structures is then placed in the bottom of the outer container, as shown in Fig. 11, and the side wall structure is inserted in the container so that its bottom wall rests against the top of the air chamber structure in the bottom of the container. The inner container *c* may then be filled as desired, covered and placed in the receptacle or, if the inner container *c* be omitted, the material to be preserved is charged directly into the receptacle. Another air chamber structure similar to that placed at the bottom of the container is then placed on top resting upon the upper wall of the side wall structure and the cover *b* put in place. It is obvious that by the means described the inner container, or, if this is omitted, the space within the receptacle, is entirely surrounded by a double celled air chamber structure.

The inner container is not necessarily in the form of a box as it may comprise any suitable container for holding either liquid or solid substance, for example, a milk bottle, or a carton for holding ice cream. The type of inner container is, therefore, immaterial and in fact for certain substances, as heretofore pointed out, there need be no inner container at all, as the walls of the air chambers themselves form a receptacle and many foods or other materials could be placed loosely in such receptacle without being placed in an inner container. For its largest use, however, the outer and inner containers may comprise folding or knockdown pasteboard or strawboard boxes, as shown in Figs. 1 and 2, which in connection with the air chamber structures shown and described, may, after being formed up, be folded or collapsed into flat position, permit the manufacture of the structure which can be shipped flat and set up by the user as desired.

In actual test a non-heat-conducting receptacle, such as is shown in Figs. 3 to 6 inclusive, has been found to keep a pint of brick ice cream in solid condition for a period of three hours in a temperature of from 75° to 80° F. and a non-heat-conducting receptacle, such as is shown in Figs. 7 to 11 inclusive, has been found to keep a brick of Neapolitan ice cream containing mixed ice and ice cream, one of the most difficult compounds to preserve in a solid state, in an absolutely solid condition for a period of over four hours and in fact at the expiration of that time the ice crystallization on the outside of the inner container was still visible and there was absolutely no indication of any melting whatever of the contents of said inner container. Such structures as have been described make it possible to ship ice cream for a considerable distance without the necessity of providing large pails of cracked ice which must be returned after use and make it possible to preserve many substances for a considerable period of time so that they can be used on picnics, etc. Of course there are many uses for such receptacles as I have described in connection with the delivery of other commodities, such as butter, milk, etc., on which heat has a deleterious effect.

While I have described the use of the receptacles in connection with preserving the contents from the effect of exterior heat, it is obvious that they are as well adapted for the preserving of a heated material and preventing the heat therein from being outwardly conducted.

The provision of an air chamber structure such as is shown in either Figs. 3 to 6 inclusive or Figs. 7 to 11 inclusive, reduces the number of pieces of material to a minimum, while forming either a continuous single or a continuous double celled air chamber structure entirely surrounding the sides of the inner receptacle. The top and bottom pieces also have single or double cells so that the receptacle is entirely surrounded by air chambers as described. The whole device of either type is very simple in construction as well as in operation.

Of course the air chamber structures may be made so as to have more than two air spaces within them if desirable in such manner as to constitute a plural number of air cells, and the air spaces may be of any thickness required, the thicker the air space the greater the amount of insulation as is obvious.

As the form or shape of either containers or the blanks may be widely varied without departing from the spirit of my invention, I do not restrict myself to the details as shown and described further than the scope of the appended claims demand. It is also obvious that either the inner or outer container or both may be of waterproof material, such as waxed board or varnished board for example.

What I claim and desire to secure by Letters Patent is:

1. A non-heat-conducting receptacle, comprising an outer container having air chambers at its top and bottom, and a closed air chamber structure arranged adjacent to the sides of the container and constructed of a blank folded to form a continuous closed air cell.

2. A non-heat-conducting receptacle, comprising an outer container having air chambers at its top and bottom, and a self-contained closed air chamber structure fitted to the shape of the container and arranged adjacent to but constructed independent of the sides of the container.

3. A non-heat-conducting receptacle, comprising an outer container having air chambers at its top and bottom, and a closed cellular structure arranged adjacent to the sides of the container and having a plurality of parallel-disposed continuously connecting air chambers.

4. A non-heat-conducting receptacle, comprising an outer container having air chambers at its top and bottom, and a closed plural-celled air chamber structure arranged adjacent to the sides of the container and constructed of a blank folded to form a plurality of continuously extending parallel connecting air cells.

5. A non-heat-conducting receptacle, comprising an outer container in the form of a knockdown paper box, having air chambers at its top and bottom in the form of collapsible structures adapted to form air cells, and also having air chambers adjacent the sides of the container in the form of a blank folded to form a collapsible continuously extending closed air cell structure including a plurality of connecting air chambers.

6. In a non-heat-conducting receptacle, a self-contained air chamber structure in collapsible form, having a series of connecting air cells joined together to form a continuous closed air chamber surrounding the sides of the container on the inside.

In testimony whereof I have signed this specification in the presence of two subscribing witnesses.

CLARENCE C. WILSON.

Witnesses:
SEABURY C. MASTICK,
K. G. LE ARD.